United States Patent
Nemirovsky et al.

(10) Patent No.: US 7,035,998 B1
(45) Date of Patent: Apr. 25, 2006

(54) CLUSTERING STREAM AND/OR INSTRUCTION QUEUES FOR MULTI-STREAMING PROCESSORS

(75) Inventors: Mario Nemirovsky, Saratoga, CA (US); Stephen W. Melvin, San Francisco, CA (US); Nandakumar Sampath, Santa Clara, CA (US); Enrique Musoll, San Jose, CA (US); Hector Urdaneta, Santa Clara, CA (US)

(73) Assignee: MIPS Technologies, Inc., Mountain View, CA (US)

( * ) Notice: Subject to any disclaimer, the term of this patent is extended or adjusted under 35 U.S.C. 154(b) by 716 days.

(21) Appl. No.: 09/706,157

(22) Filed: Nov. 3, 2000

(51) Int. Cl.
*G06F 15/00* (2006.01)

(52) U.S. Cl. ........................... 712/215
(58) Field of Classification Search ............ 712/215
See application file for complete search history.

(56) References Cited

U.S. PATENT DOCUMENTS

| | | | |
|---|---|---|---|
| 3,771,138 A | 11/1973 | Celtruda et al. | |
| 4,916,652 A | 4/1990 | Schwarz et al. | |
| 5,404,469 A | 4/1995 | Chung et al. | |
| 5,430,851 A | 7/1995 | Hirata et al. | |
| 5,574,939 A | 11/1996 | Keckler et al. | |
| 5,604,909 A | 2/1997 | Joshi et al. | |
| 5,699,537 A * | 12/1997 | Sharangpani et al. | 712/217 |
| 5,724,565 A * | 3/1998 | Dubey et al. | 712/245 |
| 5,742,782 A | 4/1998 | Ito et al. | |
| 5,745,725 A | 4/1998 | Simpson | |
| 5,745,778 A * | 4/1998 | Alfieri | 712/1 |
| 5,812,811 A | 9/1998 | Dubey et al. | |
| 5,913,049 A | 6/1999 | Shiell et al. | |
| 5,933,627 A | 8/1999 | Parady | |
| 6,092,175 A | 7/2000 | Levy et al. | |
| 6,105,053 A * | 8/2000 | Kimmel et al. | 718/105 |
| 6,105,127 A | 8/2000 | Kimura et al. | |
| 6,141,746 A * | 10/2000 | Kawano et al. | 712/214 |
| 6,219,780 B1 * | 4/2001 | Lipasti | 712/215 |
| 6,343,348 B1 * | 1/2002 | Tremblay et al. | 711/149 |
| 6,378,063 B1 * | 4/2002 | Corwin et al. | 712/217 |
| 6,470,443 B1 | 10/2002 | Emer et al. | |
| 6,542,991 B1 * | 4/2003 | Joy et al. | 712/228 |
| 6,622,240 B1 | 9/2003 | Olson et al. | |
| 6,691,221 B1 * | 2/2004 | Joshi et al. | 712/215 |

OTHER PUBLICATIONS

Diefendorff, Keith, Power4 Focuses on Memory Bandwidth, Microprocessor Report, http://www.mdronline.com/mpr/h/19991006/131302.html, Oct. 6, 1999.

(Continued)

*Primary Examiner*—Eric Coleman
(74) *Attorney, Agent, or Firm*—Donald R. Boys; James W. Huffman

(57) ABSTRACT

A pipelined multistreaming processor has an instruction source, a first cluster of a plurality of streams fetching instructions from the instruction source, a second cluster of a plurality of streams fetching instructions from the instruction source, dedicated instruction queues for individual streams in each cluster, a first dedicated dispatch stage in the first cluster for dispatching instructions to execution units, and a second dedicated dispatch stage in the second cluster for selecting and dispatching instructions to execution units. The processor is characterized in that the clusters operate independently, with the dedicated dispatch stage taking instructions only from the instruction queues in the individual clusters to which the dispatch stages are dedicated. In preferred embodiments there are dedicated fetch and dispatch stages for streams in the clusters, and dedicated execution units to which instructions may be dispatched.

20 Claims, 4 Drawing Sheets

OTHER PUBLICATIONS

Diefendorff, Keith, Digital 21264 Sets New Standard, Microprocessor Report, http://www.mdronline.com/mpr/h/19961028/101402.html, Oct. 28, 1996.

The PowerPC Architecture: A Specification for a New Family of RISC Processors, Second Edition, Morgan Kaufmann, San Francisco, pp. 70-92 (May 1994).

MC68020 32-Bit Microprocessor User's Manual, Third Edition, Prentice Hall, New Jersey, pp. 3-125, 3-126, and 3-127 (1989).

Potel, M.J., "Real-Time Playback in Animation Systems," Proceedings of the 4th Annual Conference on Computer Graphics and Interactive Techniques, San Jose, CA, pp. 72-77 (1977).

ARM Architecture Reference Manual, Prentice Hall, pp. 3-41, 3-42, 3-43, 3-67, 3-68 (1996).

ESA/390 Principles of Operation, IBM Library Server, Table of Contents and Para, 7.5.31 and 7.5.70 (1993) (available at: http://publibz.boulder.ibm.com/cgi-bin/bookmgr_OS390/BOOK/DZ9AR001/CCONTENTS).

MC88110 Second Generation RISC Microprocessor User's Manual, Motorola, Inc., pp. 10-66, 10-67, and 10-71 (1991).

Diefendorff, Keith et al., "Organization of the Motorola 88110 Superscalar RISC Microprocessor," IEEE Micro, vol, 12, No. 2, pp. 40-63 (1992).

Kane, Gerry, PA-RISC 2.0 Architecture, Prentice Hall, New Jersey, pp. 7-106 and 7-107 (1996).

Diefendorff, Keith et al., "AltiVec Extension to PowerPC Accelerates Media Processing," IEEE Micro, vol. 20, No. 2, pp. 85-95 (Mar.-Apr. 2000).

Diefendorff, Keith, "WinChip 4 Thumbs Nose at ILP," Microprocessor Report, vol. 12, No. 16, 10 pages (Dec. 7, 1998).

Slater, Michael, "Rise Joins x86 Fray with mP6," Microprocessor Report, vol. 12, No. 15, 10 pages (Nov. 16, 1998).

Diefendorff, Keith, "Jalapeno Powers Cyrix's M3," Microprocessor Report, vol. 12, No. 15, 11 pages (Nov. 16, 1998).

Becker, Michael C. et al., "The PowerPC 601 Microprocessor," IEEE Micro, vol. 13, No. 5, pp. 54-68 (Oct. 1993).

Diefendorff, Keith, "Compaq Chooses SMT for Alpha,"Microprocessor Report, vol. 13, No. 16, 13 pages (Dec. 6, 1999).

Eggers, Susan J. et al., "Simultaneous Multithreading: A Platform for Next-Generation Processors," IEEE Micro, vol. 17, No. 5, pp. 12-19 (Sep./Oct. 1997).

Gwennap, Linley, "Digital 21264 Sets New Standard," Microprocessor Report, vol. 10, No. 14, 11 pages (Oct. 28, 1999).

Diefendorff, Keith, "Power4 Focuses on Memory Bandwith," Microprocessor Report, vol. 13, No. 13, 13 pages (Oct. 6, 1999).

Diefendorff, Keith, "K7 Challenges Intel," Microprocessor Report, vol. 12, No. 14, 7 pages (Oct. 26, 1998).

* cited by examiner

CLUSTERING STREAM AND/OR INSTRUCTION QUEUES FOR MULTI-STREAMING PROCESSORS

FIELD OF THE INVENTION

The present invention is in the field of digital processing and pertains more particularly to architecture and operation in dynamic multistreaming processors.

BACKGROUND OF THE INVENTION

Conventional pipelined single-stream processors incorporate fetch and dispatch pipeline stages, as is true of most conventional processors. In such processors, in the fetch stage, one or more instructions are read from an instruction cache and in the dispatch stage, one or more instructions are sent to execution units (EUs) to execute. The stages may be separated by one or more other stages, for example a decode stage. In such a processor the fetch and dispatch stages are coupled together such that the fetch stage generally fetches from the instruction stream in every cycle.

In multistreaming processors known to the present inventors, multiple instruction streams are provided, each having access to the execution units. Multiple fetch stages may be provided, one for each instruction stream, although one dispatch stage is employed. Thus, the fetch and dispatch stages are coupled to one another as in other conventional processors, and each instruction stream generally fetches instructions in each cycle. That is, if there are five instruction streams, each of the five fetches in each cycle, and there needs to be a port to the instruction cache for each stream, or a separate cache for each stream.

In a multistreaming processor multiple instruction streams share a common set of resources, for example execution units and/or access to memory resources. In such a processor, for example, there may be M instruction streams that share Q execution units in any given cycle. This means that a set of up to Q instructions is chosen from the M instruction streams to be delivered to the execution units in each cycle. In the following cycle a different set of up to Q instructions is chosen, and so forth. More than one instruction may be chosen from the same instruction stream, up to a maximum P, given that there are no dependencies between the instructions.

It is desirable in multistreaming processors to maximize the number of instructions executed in each cycle. This means that the set of up to Q instructions that is chosen in each cycle should be as close to Q as possible. Reasons that there may not be Q instructions available include flow dependencies, stalls due to memory operations, stalls due to branches, and instruction fetch latency.

A further difficulty in multi-streaming processors, particularly is such processors having a relatively large number of streams, is in operating the processor over all of the streams.

What is clearly needed in the art is an apparatus and method to cluster streams in a multi-streaming processor, such that separate clusters can operate substantially independently. The present invention, in several embodiments described in enabling detail below, provides a unique solution.

SUMMARY OF THE INVENTION

In a preferred embodiment of the present invention a pipelined multistreaming processor is provided, comprising an instruction source, a first cluster of a plurality of streams fetching instructions from the instruction source, a second cluster of a plurality of streams fetching instructions from the instruction source, dedicated instruction queues for individual streams in each cluster, a first dedicated dispatch stage in the first cluster for dispatching instructions to execution units, and a second dedicated dispatch stage in the second cluster for selecting and dispatching instructions to execution units. The processor is characterized in that the clusters operate independently, with the dedicated dispatch stage taking instructions only from the instruction queues in the individual clusters to which the dispatch stages are dedicated.

In some embodiments individual ones or groups of execution units are associated with and dedicated for use by individual clusters. Also in some embodiments individual streams in a cluster have one or both of dedicated fetch and dispatch stages. In a particular embodiment the total number of streams in the processor is eight, with four streams in each cluster, and one stream from each cluster fetches instructions from the instruction source in each cycle. Further, in the particular embodiment, the select system may monitor a set of fetch program counters (FPC) having one FPC dedicated to each stream, and direct fetching if instructions beginning at addresses according to the to the program counters. Still further, in a particular embodiment, each stream selected to fetch for a cluster is directed to fetch eight instructions from the instruction source.

In some cases there may be one or more general execution units to which either or both dispatch stages may dispatch instructions. Also in preferred embodiments, each stream in each cluster has an associated instruction queue.

In another aspect of the invention, in a pipelined multistreaming processor having an instruction source and a plurality of streams, a method for simplifying implementation and operation of the streams is provided, comprising the steps of (a) clustering the streams into two or more clusters, with each cluster having a fetch stage; (b) dedicating a dispatch stage to each cluster, for dispatching instructions to execution units; and (c) fetching, in each cycle, a series of instructions from the instruction source by a single cluster.

In some embodiments of this method there groups of execution units dedicated to each cluster, to which the dispatch stages in that cluster may dispatch instructions. There are also, in some embodiments, one or both of fetch or dispatch stages dedicated to individual streams in a cluster. In a particular embodiment the total number of streams in the processor is eight, and the number of streams in each cluster is four. Also in a particular embodiment the select system monitors a set of fetch program counters (FPC) having one FPC associated with each stream, and directs fetching of instructions beginning at addresses according to the program counters. Further in a particular embodiment each stream selected to fetch is directed to fetch eight instructions from the instruction source.

In some embodiments of the method the processor further comprises one or more general execution units, and each dispatch stage is enabled to dispatch instructions to the general execution units. Also in some embodiments each stream in each cluster has an instruction queue associated with that stream, and further comprising a step for dispatching instructions to execution units dedicated to each cluster from the instruction queues associated with the streams in each cluster.

In embodiments of the present invention, described in enabling detail below, for the first time a pipelined, multistreaming processor is provided, wherein streams may be clustered, and operations may therefore be more efficiently accomplished.

DESCRIPTION OF THE PREFERRED EMBODIMENTS

Figure 1:
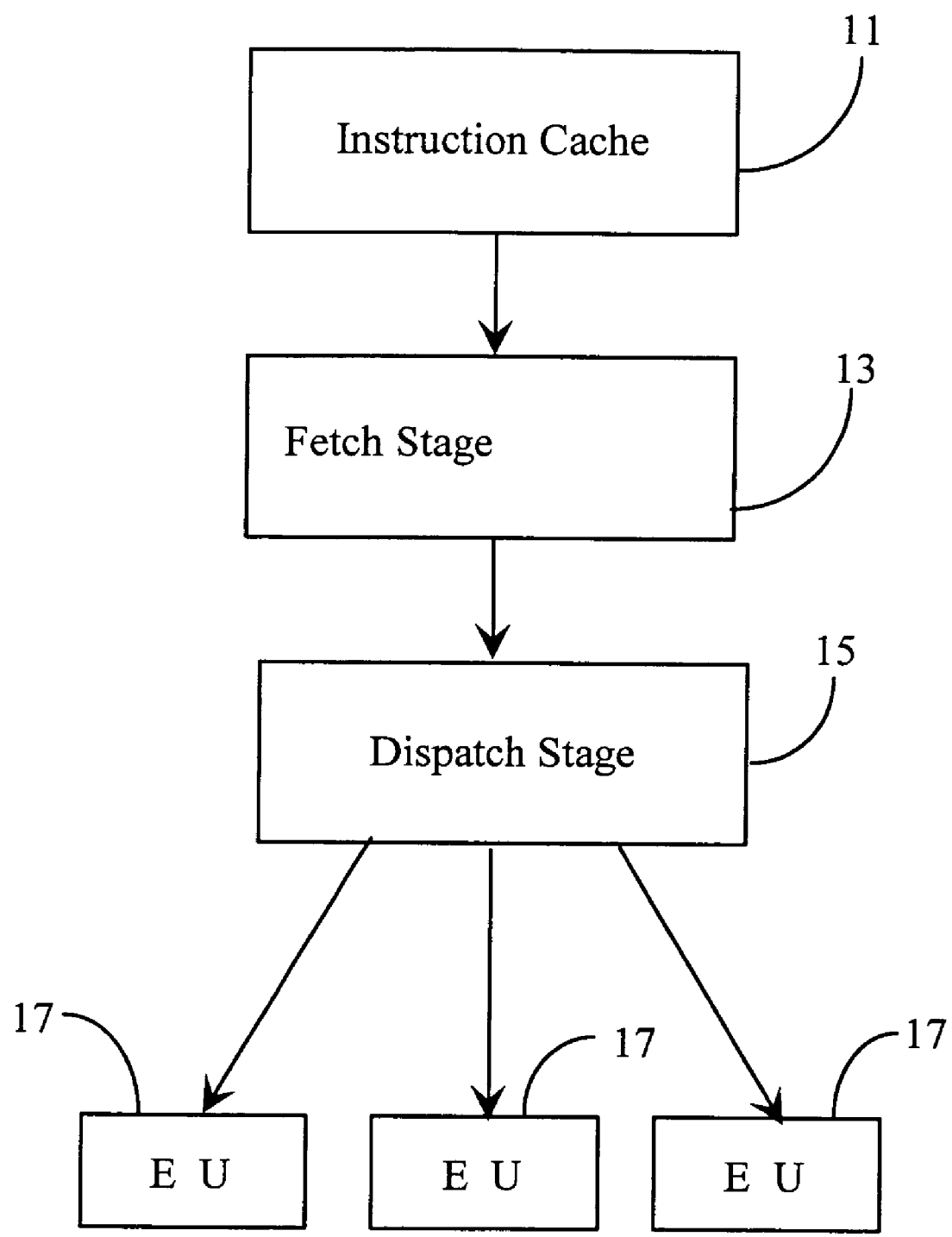
FIG. 1 is a block diagram depicting a pipelined structure for a processor in the prior art.

FIG. 1 is a block diagram depicting a pipelined structure for a processor in the prior art. In this prior art structure there is an instruction cache 11, wherein instructions await selection for execution, a fetch stage 13 which selects and fetches instruction into the pipeline, and a dispatch stage which dispatches instructions to execution units (EUs) 17. In many conventional pipelined structures there are additional stages other than the exemplary stages illustrated here.

In the simple architecture illustrated in FIG. 1 everything works in lockstep. In each cycle an instruction is fetched, and another previously fetched instruction is dispatched to one of the execution units.

Figure 2:
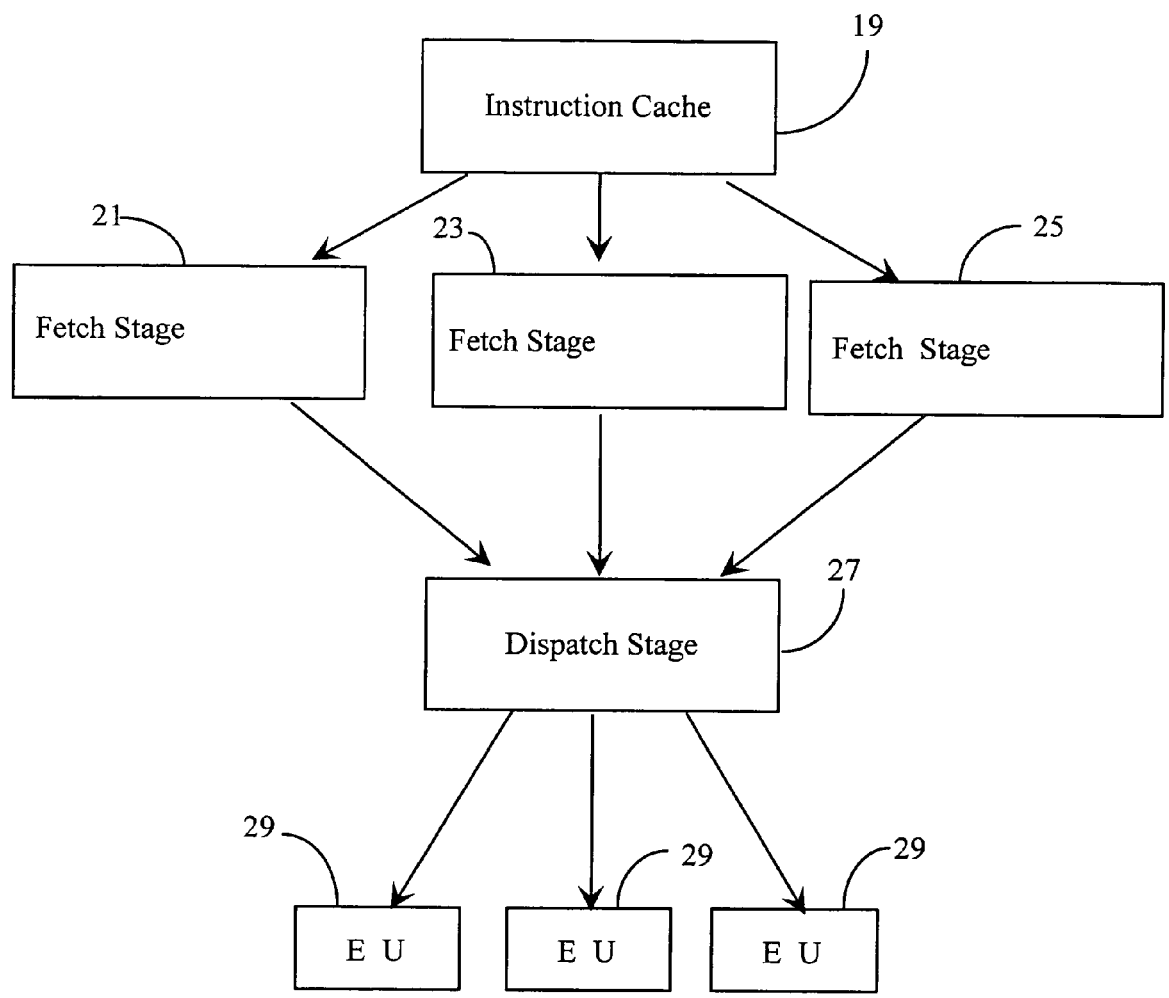
FIG. 2 is a block diagram depicting a pipelined structure for a multistreaming processor known to the present inventors.

FIG. 2 is a block diagram depicting a pipelined structure for a multistreaming processor known to the present inventors, wherein a single instruction cache 19 has ports for three separate streams, and one instruction is fetched per cycle by each of three fetch stages 21, 23 and 25 (one for each stream). In this particular case a single dispatch stage 27 selects instructions from a pool fed by the three streams and dispatches those instructions to one or another of three execution units 29. In this architecture the fetch and dispatch units are still directly coupled. It should be noted that the architecture of FIG. 2, while prior to the present invention, is not necessarily in the public domain, as it is an as-yet proprietary architecture known to the present inventors. In another example, there may be separate caches for separate streams, but this does not provide the desired de-coupling.

Figure 3:
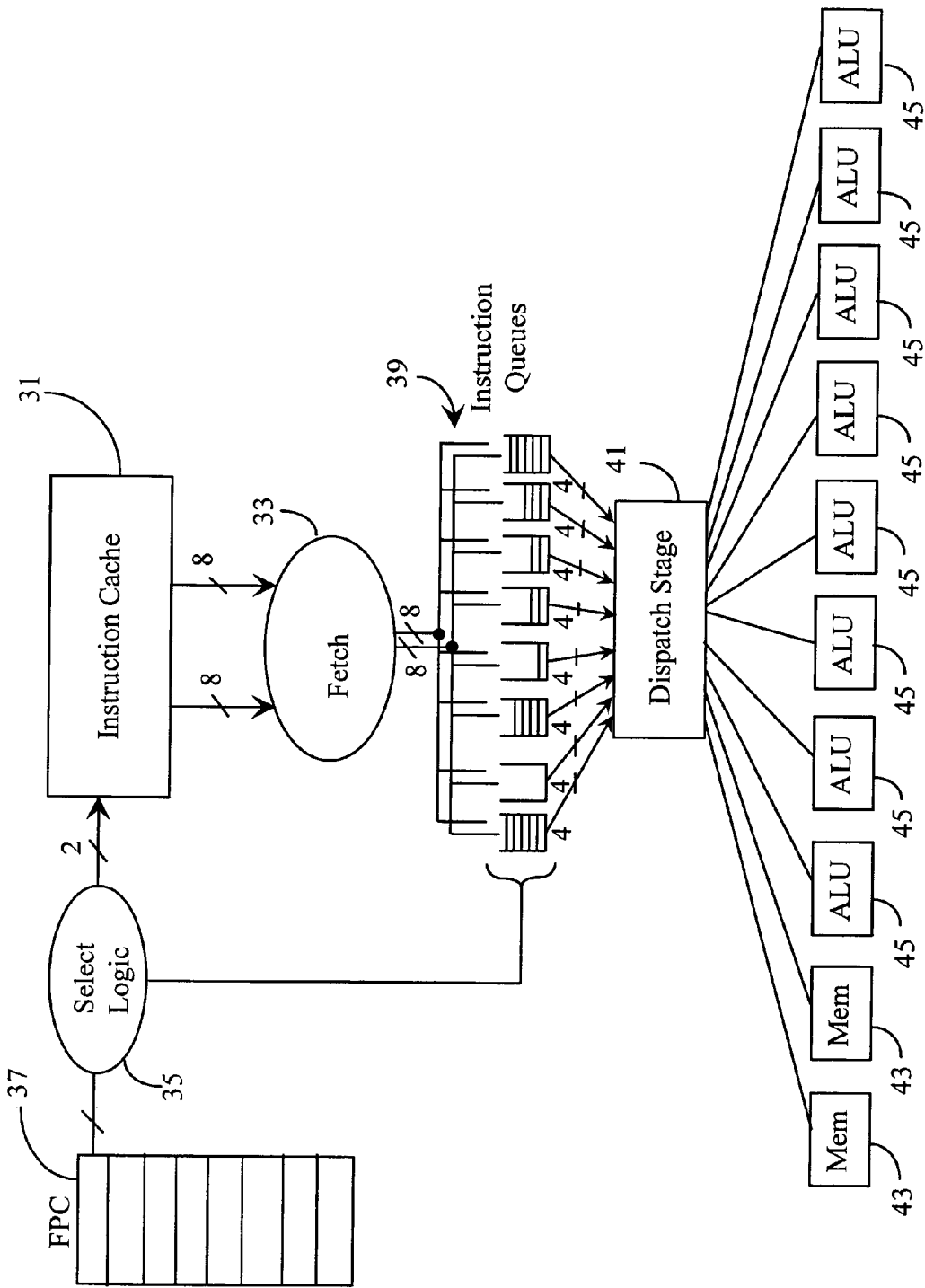
FIG. 3 is a block diagram for a pipelined architecture for a multistreaming processor according to an embodiment of the present invention.

FIG. 3 is a block diagram depicting an architecture for a dynamic multistreaming (DMS) processor according to an embodiment of the present invention. In this DMS processor there are eight streams and ten functional units, which may also be called execution units. Instruction cache 31 in this embodiment has two ports for providing instructions to fetch stage 33. Eight instructions may be fetched each cycle for each port, so 16 instructions may be fetched per cycle. The fetch stage is not explicitly shown in the staged pipeline as per the previous examples, but is described further below.

In a preferred embodiment of the present invention queues 39 are provided, which effectively decouple fetch and dispatch stages in the pipeline. There are in this embodiment eight instruction queues, one for each stream. In the example of FIG. 3 the instruction queues are shown in a manner to illustrate that each queue may have a different number of instructions ready for transfer to a dispatch stage 41.

Referring again to instruction cache 31 and the two ports to fetch stage 33, it was described above that eight instructions may be fetched to fetch stage 33 by each port. Typically the eight instructions for one port are eight instructions from a single thread for a single stream. For example, the eight instructions fetched by one port in a particular cycle will typically be sequential instructions for a thread associated with one stream.

Determination of the two threads associated with two streams to be accessed in each cycle is made by selection logic 35. Logic 35 monitors a set of fetch program counters 37, which maintain a program counter for each stream, indicating at what address to find the next instruction for that stream. Select logic 35 also monitors the state of each queue in set 39 of instruction queues. Based at least in part on the state of instruction queues 39 select logic 35 determines the two threads from which to fetch instructions in a particular cycle. For example, if the instruction queue in set 39 for a stream is full, the probability of utilizing eight additional instructions into the pipeline from the thread associated with that stream is low. Conversely, if the instruction queue in set 39 for a stream is empty, the probability of utilizing eight additional instructions into the pipeline from the thread associated with that stream is high.

In this embodiment, in each cycle, four instructions are made available to dispatch stage 41 from each instruction queue. In practice dispatch logic is provided for selecting from which queues to dispatch instructions. The dispatch logic has knowledge of many parameters, typically including priorities, instruction dependencies, and the like, and is also aware of the number of instructions in each queue.

As described above, there are in this preferred embodiment ten execution units, which include two memory units 43 and eight arithmetic logic units (ALUs) 45. Thus, in each cycle up to ten instructions may be dispatched to execution units.

In the system depicted by FIG. 3 the unique and novel set of instruction queues 39 provides decoupling of dispatch from fetch in the pipeline. The dispatch stage now has a larger pool of instructions from which to select to dispatch to execution units, and the efficiency of dispatch is improved. That is the number of instructions that may be dispatched per cycle is maximized. This structure and operation allows a large number of streams of a DMS processor to execute instructions continually while permitting the fetch mechanism to fetch from a smaller number of streams in each cycle. Fetching from a smaller number of streams, in this case two, in each cycle is important, because the hardware and logic necessary to provide additional ports into the instruction cache is significant. As an added benefit, unified access to a single cache is provided.

Thus the instruction queue in the preferred embodiment allows fetched instructions to be buffered after fetch and before dispatch. The instruction queue read mechanism allows the head of the queue to be presented to dispatch in each cycle, allowing a variable number of instructions to be dispatched from each stream in each cycle. With the instruction queue, one can take advantage of instruction stream locality, while maximizing the efficiency of the fetch mechanism in the presence of stalls and branches. By providing a fetch mechanism that can support up to eight instructions from two streams, one can keep the instruction queues full while not having to replicate the fetch bandwidth across all streams.

Clustering Streams and/or Instruction Queues

Figure 4:
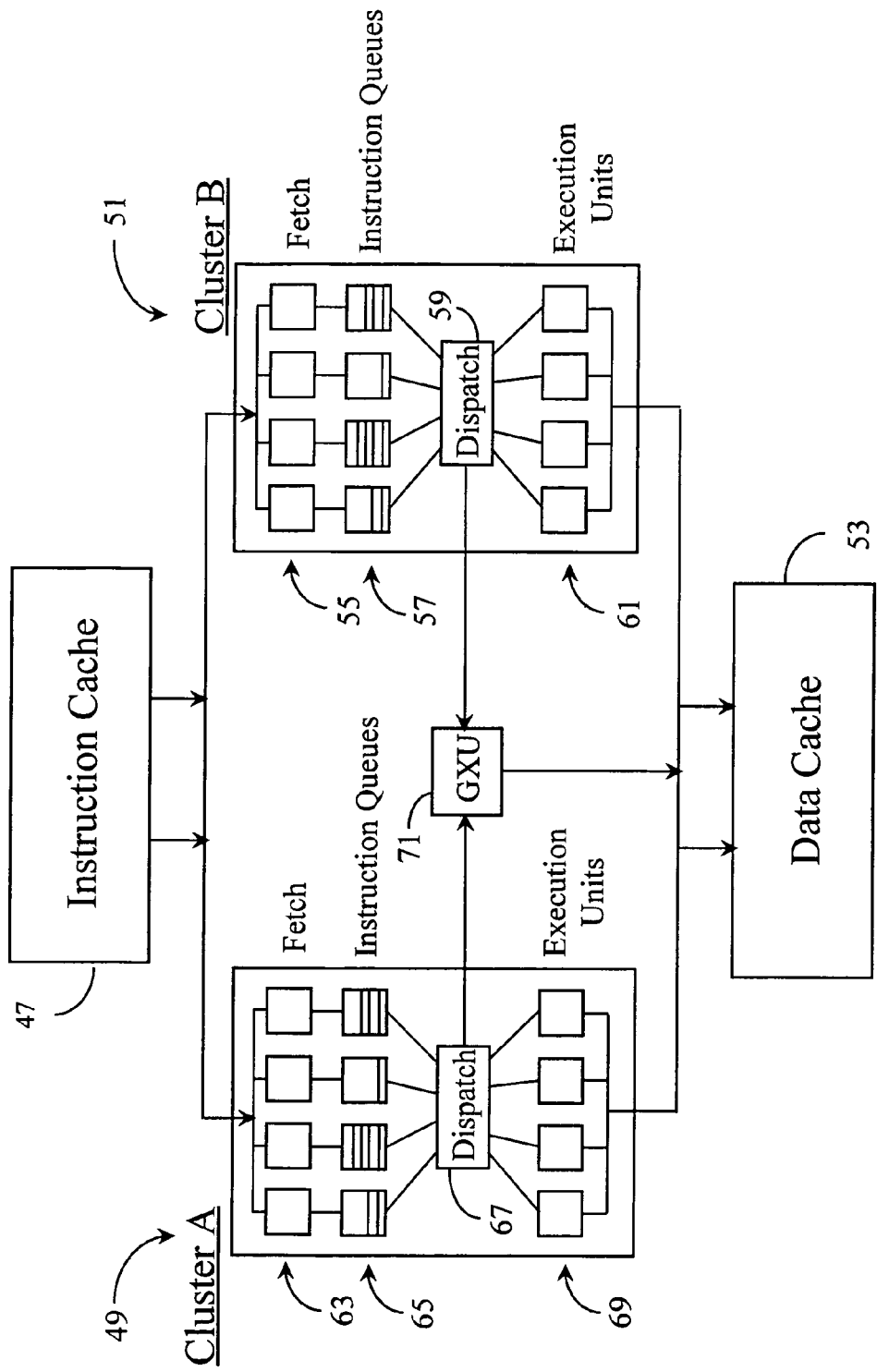
FIG. 4 is a block diagram for a pipelined architecture for a multistreaming processor according to another embodiment of the present invention.

In an alternative embodiment of the present invention a further innovation is made in a multistreaming processor which may or may not have instruction queues associated with streams FIG. 4 is a block diagram for a pipelined architecture for a multistreaming processor according to another embodiment of the present invention. In the processor illustrated by FIG. 4 there are eight streams, just as in the processor of FIG. 3. There are also eight fetch stages, one for each stream, and a full set of execution units. In this example there are instruction queues shown, one for each stream, but the presence of these queues is not required for the present invention. A salient difference from architecture previously described is that the plurality of streams is grouped into two distinct clusters.

Referring again to FIG. 4, instructions are fetched from instruction cache 47 by two stream clusters 49 and 51, labeled Cluster A and Cluster B. Cluster A comprises four streams, each having a fetch stage 63 and a set of instruction queues 65, one for each stream. The instruction queues operate as described above for the processor of FIG. 3. Cluster A further has a dispatch stage 67 for the four streams in the cluster, which dispatches instructions from queues 65 to a set of functional, or execution units 69.

Cluster B (51) has the same structure as Cluster A, comprising four streams, each with a fetch stage in set 55, each having an instruction queue in set 57, and a dedicated dispatch stage 59 which dispatches instructions from the instruction queues to a set of execution (functional) units 61.

In some embodiments of this unique architecture there are one or more general execution units (GXU) 71, to which instructions may be dispatched by either of dispatch stages 67 or 59. The clusters share a common data cache 53.

Instruction cache 47 still has two ports, as in the previously described embodiment, and there is a select system, much as previously described, for selecting which stream in each cycle in each Cluster will fetch instructions. The select system has access, as before, to FPCs, and monitors the state of each instruction queue in each Cluster. In the present case one stream of four in each Cluster is selected each cycle to fetch eight sequential instructions beginning at the PC address.

Referring again to FIG. 4, there are two dispatch stages, one for each cluster, each of which dispatches instructions from only the queues in its own associated Cluster.

A distinct advantage in clustering streams with use of instruction queues as described and taught herein, is that the overall complexity, hence cost, of implementing two 4×4 clusters is less than implementing the 8×8 array described with the aid of FIG. 3.

The skilled artisan will recognize that there are a number of alterations that might be made in embodiments of the invention described above without departing from the spirit and scope of the invention. For example, the number of instruction queues may vary, the number of ports into the instruction cache may vary, the fetch logic may be implemented in a variety of ways, and the dispatch logic may be implemented in a variety of ways, among other changes that may be made within the spirit and scope of the invention. There can also be a different clustering of streams than that depicted and described as an example herein. For these and other reasons the invention should be afforded the broadest scope, and should be limited only by the claims that follow.

What is claimed is:

1. A pipelined multistreaming processor, comprising:
an instruction cache having a plurality of ports:
a first cluster of a plurality of instruction streams, said first cluster fetching instructions from said instruction cache;
a second cluster of a plurality of instruction streams, said second cluster fetching instructions from said instruction cache;
a plurality of instruction queues, one for each of said instruction streams in each of said first and second clusters;
a first dispatch stage, coupled to said first cluster, for dispatching to execution units instructions from said instruction streams in said first cluster; and
a second dispatch stage, coupled to said second cluster, for dispatching to execution units instructions from said instruction streams in said second cluster;
wherein said first and second clusters operate independently, with said first and second dispatch stages taking instructions only from said plurality of instruction queues which are in said clusters to which said dispatch stages are dedicated; and
wherein said first and second clusters are coupled to said plurality of ports on said instruction cache, and can each utilize one or more of said plurality of ports.

2. The processor of claim 1 wherein individual ones or groups of said execution units are associated with and dedicated for use by either said first or second clusters.

3. The processor of claim 1 wherein said individual streams in said first cluster have dedicated fetch stages.

4. The processor of claim 1 wherein the total number of said streams in the processor is eight, with four streams in each of said first and second clusters.

5. The processor of claim 1 wherein instructions are fetched in each cycle for one of said instruction streams in each of said first and second clusters.

6. The processor of claim 1 wherein a set of fetch program counters (FPC) are monitored with one FPC dedicated to each of said instruction streams in each of said first and second clusters, and fetching of said instructions is directed beginning at addresses according to said fetch program counters.

7. The processor of claim 1 wherein eight of said instructions are fetched for one of said instruction streams each time instructions are fetched for that stream.

8. The processor of claim 1 further comprising one or more execution units coupled to said first and second dispatch stages to which either or both of said first and second dispatch stages may dispatch said instructions.

9. In a pipelined multistreaming processor having an instruction cache which has a plurality of ports, and a plurality of instruction streams executing within the processor, a method for clustering ones of the plurality of instruction streams, comprising:
clustering a first plurality of the instruction streams into a first cluster;
clustering a second plurality of the instruction streams into a second cluster, the first and second plurality of the instruction streams being independent;
providing a first dispatch stage to the first plurality of instruction streams of the first cluster, for dispatching the first plurality of instructions to first execution units;
providing a second dispatch stage to the second plurality of instruction streams of the second cluster, for dispatching the second plurality of instructions to second execution units; and in each cycle, fetching, instructions from the instruction cache for one of the instruction streams in each of the first and second cluster.

10. The method of claim 9 wherein a first plurality of execution units form the first execution units, and are dedicated to the first cluster, and a second plurality of execution units form the second execution units, and are dedicated to the second cluster.

11. The method of claim 9 wherein said step of fetching utilizes fetch stages in each of the first and second clusters to fetch instructions for the instruction streams in each of the first and second clusters.

12. The method of claim 9 wherein the total number of instruction streams in the processor is eight, and the number of instruction streams in each of the first and second clusters is four.

13. The method of claim 9 having a fetch program counter (FPC) associated with each of the instruction streams, wherein said step of fetching is directed at addresses according within the fetch program counters.

14. The method of claim 9 wherein in said step of fetching, eight instructions are fetched each cycle for each of the first and second clusters.

15. The method of claim 9 wherein the processor includes one or more general execution units, coupled to both the first and second clusters, which may execute instructions dispatched from either or both of the first and second clusters.

16. The method of claim 9 wherein each instruction stream in the first and second clusters have an instruction queue associated with them, and wherein the method further comprises:
   dispatching instructions from the first and second clusters from the instruction queues associated with the instruction streams in the first and second clusters.

17. A processor for executing clusters of instruction threads, comprising:
   an instruction cache for providing instructions to be executed, said instruction cache having a plurality of ports for simultaneously providing said instructions for a plurality of the instruction threads;
   a first cluster, coupled to said instruction cache, said first cluster comprising:
      at least one fetch stage, for fetching instructions for a first plurality of instruction threads within said first cluster;
      a first plurality of instruction queues, coupled to said at least one fetch stage, for queuing instructions for each thread within said first plurality of instruction threads;
      at least one dispatch stage, coupled to said plurality of instruction queues, for dispatching said instructions for execution; and
      at least one execution unit, coupled to said at least one dispatch stage, for executing said instructions; and
   a second cluster, coupled to said instruction cache, said second cluster comprising:
      at least one fetch stage, for fetching instructions for a second plurality of instruction threads within said second cluster;
      a second plurality of instruction queues, coupled to said at least one fetch stage, for queuing instructions for each thread within said second plurality of instruction threads;
      at least one dispatch stage, coupled to said second plurality of instruction queues, for dispatching said instructions for execution; and
      at least one execution unit, coupled to said at least one dispatch stage, for executing said instructions;
   wherein said first cluster and said second cluster concurrently access said instruction cache.

18. The processor as recited in claim 17 further comprising:
   a general execution unit, coupled to both of said first and second cluster, for executing said instructions from both of said first and second cluster.

19. The processor as recited in claim 17 wherein said at least one dispatch stage in each of said first and second clusters dispatches said instructions from said first and second plurality of instruction queues, for each of said threads within said instruction queues.

20. The processor as recited in claim 17 further comprising:
   a data cache, coupled to each of said first and second cluster, for providing data to be operated on by each of said instruction threads in each of said clusters.

* * * * *